United States Patent
Manning (10) Patent No.: US 9,118,645 B2
(45) Date of Patent: Aug. 25, 2015

(54) DISTRIBUTED AUTHENTICATION USING PERSISTENT STATELESS CREDENTIALS

(71) Applicant: Jive Software, Inc., Portland, OR (US)

(72) Inventor: Zack Manning, Portland, OR (US)

(73) Assignee: Jive Software, Inc., Portland, OR (US)

( * ) Notice: Subject to any disclaimer, the term of this patent is extended or adjusted under 35 U.S.C. 154(b) by 163 days.

(21) Appl. No.: 13/720,422

(22) Filed: Dec. 19, 2012

(65) Prior Publication Data

US 2014/0173705 A1 Jun. 19, 2014

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)

(52) U.S. Cl.
CPC ........ *H04L 63/08* (2013.01); *H04L 9/32* (2013.01); *H04L 63/0807* (2013.01)

(58) Field of Classification Search
CPC ....... H04L 9/088; H04L 63/102; H04L 63/08; H04L 63/0807; H04L 9/32; G06F 21/31
USPC ............................................................ 726/6
See application file for complete search history.

(56) References Cited

U.S. PATENT DOCUMENTS

| | | |
|---|---|---|
| 5,560,008 A | 9/1996 | Johnson et al. |
| 5,875,296 A | 2/1999 | Shi et al. |
| 6,092,196 A | 7/2000 | Reiche |
| 6,668,322 B1 | 12/2003 | Wood et al. |
| 2002/0112152 A1* | 8/2002 | VanHeyningen et al. ...... 713/151 |
| 2005/0132070 A1* | 6/2005 | Redlich et al. ................. 709/228 |

OTHER PUBLICATIONS

Kerberos V5 System Administrator's Guide Copyright © 1985-2002 by the Massachusetts Institute of Technology.*
Request for Comments: 1510 The Kerberos Network Authentication Service (V5) Sep. 1993.*
Amazon, "Authenticating Users of AWS Mobile Applications with a Token Vending Machine," <http://aws.amazon.com/articles/SDKs/Android/4611615499399490>, 8 pages (accessed Oct. 26, 2012).
Wikipedia.com, "Initialization Vector," <http://en.wikipedia.org/wiki/Initialization_vector>, 4 pages (accessed Nov. 29, 2012).

* cited by examiner

*Primary Examiner* — Kambiz Zand
*Assistant Examiner* — Benjamin Kaplan
(74) *Attorney, Agent, or Firm* — Klarquist Sparkman, LLP (57) ABSTRACT

Techniques and tools are described for performing distributed authentication using persistent stateless credentials. Distributed authentication can be performed during egress by obtaining a principal identifier, generating an expiration time, obtaining a secret key identifier that identifies a secret key, generating an initialization vector, encrypting the principal identifier and the expiration time to produce a ciphertext, creating a credential, and providing the credential for persistence at a client device. The credential comprises the ciphertext, the initialization vector, the secret key identifier. Distributed authentication can be performed during ingress by obtaining a credential, extracting a ciphertext, an initialization vector, and a secret key identifier from the credential, obtaining a secret key identified by the secret key identifier, decrypting the ciphertext to produce a principal identifier and an expiration time and authenticating the credential using, at least in part, the principal identifier and the expiration time.

24 Claims, 8 Drawing Sheets

DISTRIBUTED AUTHENTICATION USING PERSISTENT STATELESS CREDENTIALS

BACKGROUND

Authenticating clients can be a straightforward task when using a single server. For example, clients of a server running a web application can be authenticated using a username and password with session information being stored in a cookie with server-side state information. Similarly, authentication using cookies and sessions can be performed using a group of servers with server-side state information.

However, these traditional approaches can be problematic with enterprise-level applications that include many application nodes. For example, storing credential-specific state information server-side can be problematic if a node fails. In addition, security can be an issue when storing credential-specific information at the client device.

Therefore, there exists ample opportunity for improvement in technologies related to authenticating users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for performing distributed authentication using credentials (e.g., stateless credentials persisted at the client device). For example, credentials can be used to authenticate a client to a server environment when the client accesses computing resources provided by the server environment.

As another example, a method is provided for distributed authentication using persistent stateless credentials. The method comprises obtaining a principal identifier, where the principal identifier uniquely identifies a user, generating an expiration time, obtaining a secret key identifier, where the secret key identifier identifies a secret key that is associated with the user, generating an initialization vector, encrypting the principal identifier and the expiration time using the initialization vector and the secret key identified by the secret key identifier, to produce a ciphertext, creating a credential, and providing the credential to a client device for persistence at the client device. The credential comprises the ciphertext, the initialization vector, the secret key identifier. The method can be performed, for example, by a server environment.

As another example, a method can be provided for distributed authentication using persistent stateless credentials. The method comprises obtaining a credential (e.g., from a client device), extracting information from the credential including a ciphertext, an initialization vector, and a secret key identifier, obtaining a secret key identified by the secret key identifier, decrypting the ciphertext using the initialization vector and the secret key, to produce a principal identifier and an expiration time, where the principal identifier uniquely identifies a user of the credential, and authenticating the credential using, at least in part, the principal identifier and the expiration time. The method can be performed, for example, by a server environment.

The foregoing and other objects, features, and advantages of the invention will become more apparent from the following detailed description, which proceeds with reference to the accompanying figures.

DETAILED DESCRIPTION

The following description is directed to techniques and solutions for performing distributed authentication using persistent stateless credentials. For example, a server environment comprising multiple servers (e.g., multiple application servers) can provide distributed authentication services to clients using persistent stateless credentials stored (persisted) at the clients (e.g., stored only at the clients). Security can be provided by encrypting sensitive information within the credentials.

In some implementations, an authentication scheme is provided where a credential is generated by encrypting a principal identifier and an expiration time to create a ciphertext, and composing the ciphertext with a secret key identifier and an initialization vector. The credential can then be encoded before being sent to the client. The client can then use the credential to be authenticated to any application (e.g., any application of a server environment) with access to a shared secret key repository and supporting distributed authentication using the authentication scheme. The shared secret key repository contains secret keys associated with users and identified by secret key identifiers. In a specific implementation, the secret keys are rotated at a longer interval than the lifetime of the persistent credentials. As an example, the secret keys can expire after one month, while the credentials can expire after 30 minutes.

Using the techniques and solutions described herein for distributed authentication using persistent stateless credentials provides a secure way to distribute time-bounded credentials to clients rather than saving credential-specific state server-side. For example, a client device using such a persistent stateless credential can authenticate in a secure manner to any of a number of servers of a server environment to access computing resources provided by the server environment. For example, if a particular server of the server environment fails, then an already authenticated client can still use a different server without having to go through another logon procedure (e.g., if the user's credential has not yet expired).

Using the techniques and solutions described herein for distributed authentication using persistent stateless credentials allows authentication to be decentralized. For example, the nodes of a server environment only need access to the secret keys and the authentication algorithm to authenticate a request from a client. The nodes of a server environment do not need to maintain any credential-specific state information, so a client is not tied to any specific node for authentication.

Server Environment Providing Distributed Authentication

In the techniques and solutions described herein, a server environment can provide distributed authentication services using persistent stateless credentials. For example, a server environment comprising a plurality of application servers can provide computing services to a plurality of clients. Distributed authentication can be performed using persistent stateless credentials stored on the clients.

Figure 1:
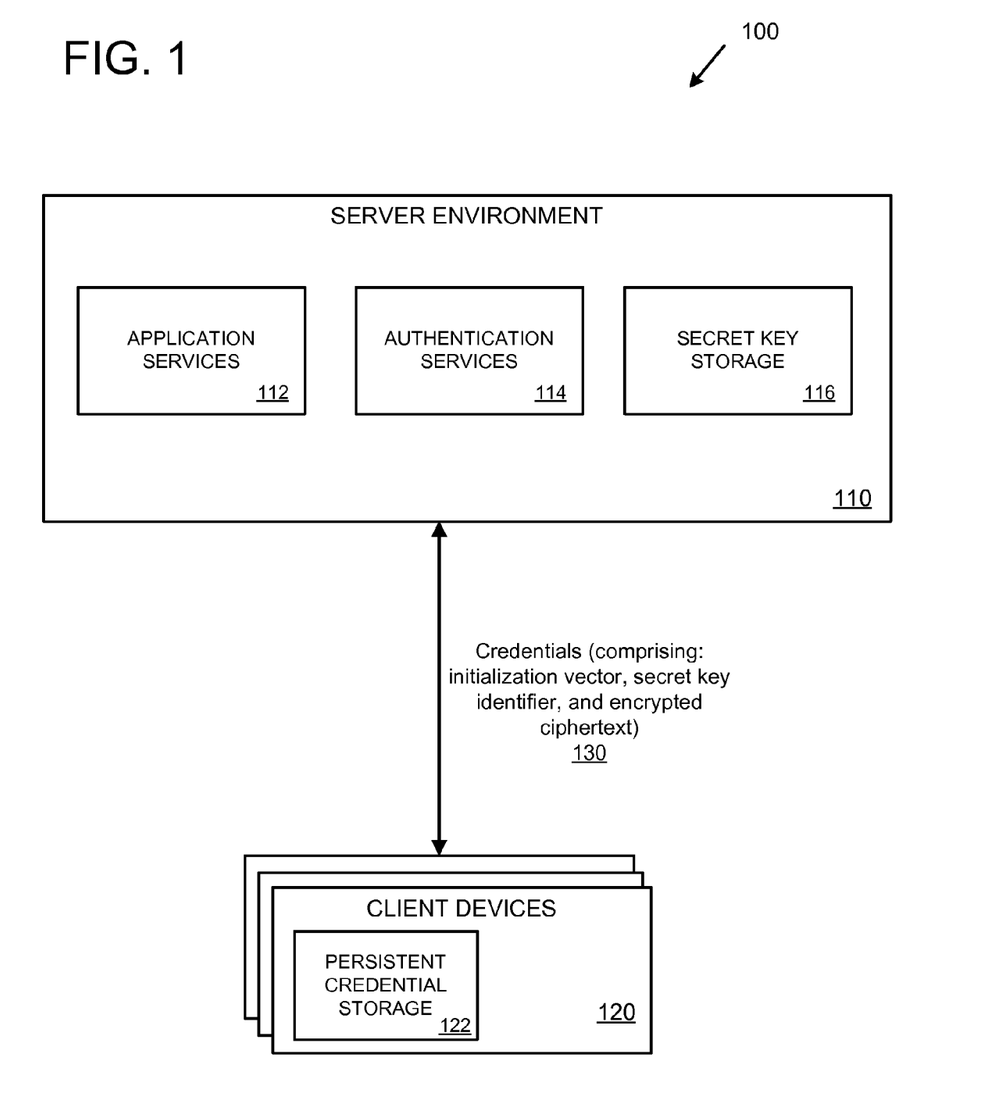
FIG. 1 is a diagram depicting an example server environment supporting distributed authentication using persistent stateless credentials.

FIG. 1 is a diagram 100 depicting an example server environment 110 supporting distributed authentication using persistent stateless credentials. The server environment 110 can comprise various types of computing resources, such as server computers, database servers, authentication servers, application servers, networking resources, etc. The server environment 110 can be implemented, for example, as part of a cloud computing environment.

The server environment 110 provides computing services to client devices 120 and their associated users. For example, the server environment 110 can provide applications (e.g., web-based applications) and/or other types of computing services to client devices 120. The client devices 120 can be client computing devices, such as desktop computers, notebook computers, tablets, smart phones, and other types of computing devices.

The server environment 110 provides application services 112, which can include, for example, web-based applications and/or other types of applications for use by client devices 120. The server environment comprises authentication services 114 supporting authenticated access by client devices 120. The server environment 110 also comprises secret key storage 116 for storing secret keys for use by the authentication services 114 and/or the application services 112. For example, the secret key storage can be a shared database or another type of shared data storage.

The server environment 110 supports distributed authentication using persistent stateless credentials. Credentials comprise an initialization vector, a secret key identifier, and a ciphertext 130. The credentials can be encoded for transmission between the server environment 110 and the client devices 120. The credentials are stored at the client devices 120. For example, the credentials can be stored by the client devices 120 in persistent credential storage 122 (e.g., in a file, database, browser cookie, etc.). In some implementations, the credentials are stored only at the client devices 120, and not at the server environment 110.

The server environment supports 110 distributed authentication by persisting the credential at the client device (e.g., one of the client devices 120). In this way, any of the computing devices (e.g., nodes, application servers, etc.) of the server environment 110 that participate in the distributed authentication can service requests from the client device by receiving and authenticating the credential provided by the client device.

The credentials are stateless because the credentials are not tied to any particular computing device of the server environment 110. Similarly, the computing devices of the server environment 110 can authenticate and process a request from any of the client devices 120. In addition, if a particular computing device of the server environment 110 fails, then another computing device can take over without the user having to re-authenticate if the credential has not yet expired.

Overview of Information Flow

In the techniques and solutions described herein, distributed authentication can be performed using stateless persistent credentials when a server environment is communicating with client devices. For example, the server environment can require that users of the client devices be authenticated before the users can access applications and/or other computing services provided by the server environment.

For example, if a user of a client device wants to access an application provided by the server environment, the user can first log on to the server environment (e.g., using a user name and password). Upon successful logon (e.g., by providing a valid user name and password) the server environment can create a credential for the user (e.g., using a secret key already associated with the user or by creating a new secret key for the user) and provide the credential to the user for persistent storage at the user's computing device (e.g., for persistence only at the user's computing device). Using the credential stored at the user device, the user can then access the server environment (e.g., use applications and/or other computing resources provided by the server environment that require authenticated access).

Figure 2:
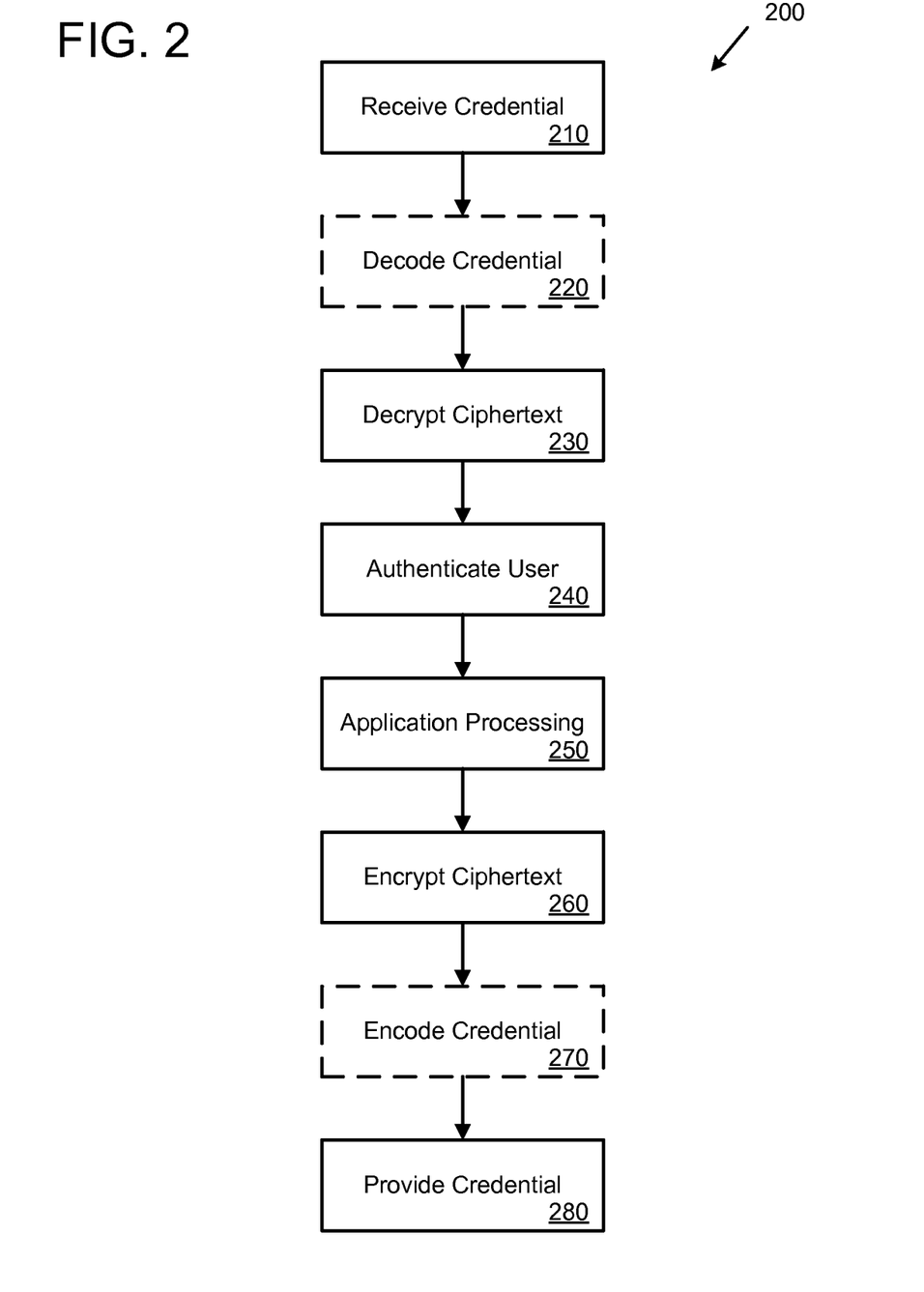
FIG. 2 is a diagram showing an example information flow for performing distributed authentication using persistent stateless credentials.

FIG. 2 is a diagram showing an example information flow 200 for performing distributed authentication using persistent stateless credentials. At 210, a credential is received from a client device. For example, the credential can be received via a Hypertext Transfer Protocol (HTTP) connection from the client device. The credential comprises an initialization vector, a secret key identifier (secret key ID), and a ciphertext (an encrypted principal identifier (principal ID) and expiration time).

In some implementations, the credential is received at 210 in an encoded format. Encoding may be needed, for example, when transmitting the credential over certain types of network connections, such as within HTTP headers. When the credential is received in an encoded format, the credential is decoded at 220. In a specific implementation, the credential is decoded using based64 decoding, which decodes the credential from an ASCII format to a binary format. Alternatively, if the credential is received at 210 without having been encoded, the decoding operation at 220 will not be needed (e.g., decoding may not be present or decoding can be skipped).

At 230, the ciphertext portion of the credential is decrypted. The ciphertext is decrypted using, at least in part, the initialization vector and the secret key identified by the secret key identifier. Decrypting the ciphertext produces the principal ID (user ID) and the expiration time for the credential. Various types of encryption algorithms can be used to encrypt/decrypt the ciphertext. In some implementations, an authenticated encryption algorithm is used. In a specific implementation, the AES-GCM authenticated encryption algorithm is used (e.g., with a 256-bit key size).

At 240, the user (principal) is authenticated using the credential. For example, the expiration time of the credential can be checked against a current time. If the expiration time has past, then the user can be required to log in again. If the expiration time has not past, then the credential can be determined to still be valid. The user ID can also be checked (e.g., to make sure it is a valid user ID).

At 250, application processing is performed. Application processing refers to any type of activity performed by a server environment for which authenticated access of the user is performed. For example, application processing can comprise responding to an application services request from the user (e.g., a request for accessing a web application, submitting information, retrieving information, executing a search query, etc.).

Once the application processing has been performed at 250, a new credential is generated and provided to the client device for persistence at the client device. For example, the new credential can be provided to the client device separately or as part of a result of the application processing (e.g., an indication of success/failure of a transaction, results for display at the client device, and/or other types of information or processing results).

In some implementations, a new credential is only generated if the current credential (received at 210) is older than an authentication refresh delay. For example, the current credential can be checked to determine if it is older than the authentication refresh delay (e.g., using the expiration time of the current credential). If the current credential is older than the authentication refresh delay, then a new credential is generated (e.g., by performing the operations depicted at 260 to 280). If the current credential is not older than the authentication refresh delay (e.g., if the authentication refresh delay is 5 minutes, then if the current credential was created less than 5 minutes ago), then a new credential will not be generated (e.g., the operations depicted at 260 to 280 can be skipped). If a new credential is not generated, then the client device will retain the current credential that is currently persisted at the client device and can use the current credential upon subsequent communication with the server environment. Using an authentication refresh delay can provide efficiency particularly when scaling to handle a large volume of requests. For example, setting an authentication refresh delay to 30 seconds allows the server environment to generate and provide a credential for persistence at the client device, and allows the client device to access the server environment many times for 30 seconds without a new credential having to be created by the server environment and stored at the client device upon each access. The authentication refresh delay can be set to a relatively short value compared to the credential lifetime (e.g., an authentication refresh delay of 5 minutes and a credential lifetime of 30 minutes).

At 260, the principal ID and an expiration time are encrypted using, at least in part, an initialization vector and the secret key, to create the ciphertext. In some implementations, the expiration time is updated, and a new initialization vector is generated, every time a new credential is generated (e.g., upon every authenticated user communication with the server environment). For example, the expiration time can be determined by adding an amount of time (e.g., a pre-determined amount of time or a pre-determined lifetime) to the current time (e.g., by adding 30 minutes to the current time, giving the credential a 30 minute lifetime).

At 270, the credential, comprising the initialization vector, the secret key ID, and the ciphertext, is encoded if necessary. For example, the credential can be encoded for transmission to the client device within an HTTP header. In some implementations, the initialization vector, the secret key ID and the ciphertext are composed and the resulting composition is encoded together. Alternatively, the initialization vector, the secret key, and the ciphertext are encoded individually. In other implementations, only the ciphertext portion of the credential is encoded.

At 280, the credential is provided to the client device for persistence at the client device. For example, the client device can store the credential in a web browser cookie at the client device. In some implementations, the credential is persisted only at the client device.

In some implementations, the distributed authentication flow using stateless persistent credentials (e.g., as depicted in the example information flow 200) can be divided into an ingress phase and an egress phase. Ingress refers to the initiation of a communication with a client where the credential is received and the user is authenticated using the credential. With reference to the example information flow 200, ingress includes operations 210 to 240. Egress refers to the completion of the communication where a new credential is created (or in some implementations where an existing credential is reused) and persisted at the client device. With reference to the example information flow 200, egress includes operations 260 to 280. After ingress, and before egress, the server environment can perform any processing operations needed according to the communication with the client (e.g., as represented at 250).

Information Flow—Ingress

In the techniques and solutions described herein, distributed authentication using persistent stateless credentials can be provided upon ingress (e.g., upon an incoming request or communication from a client device).

Figure 3:
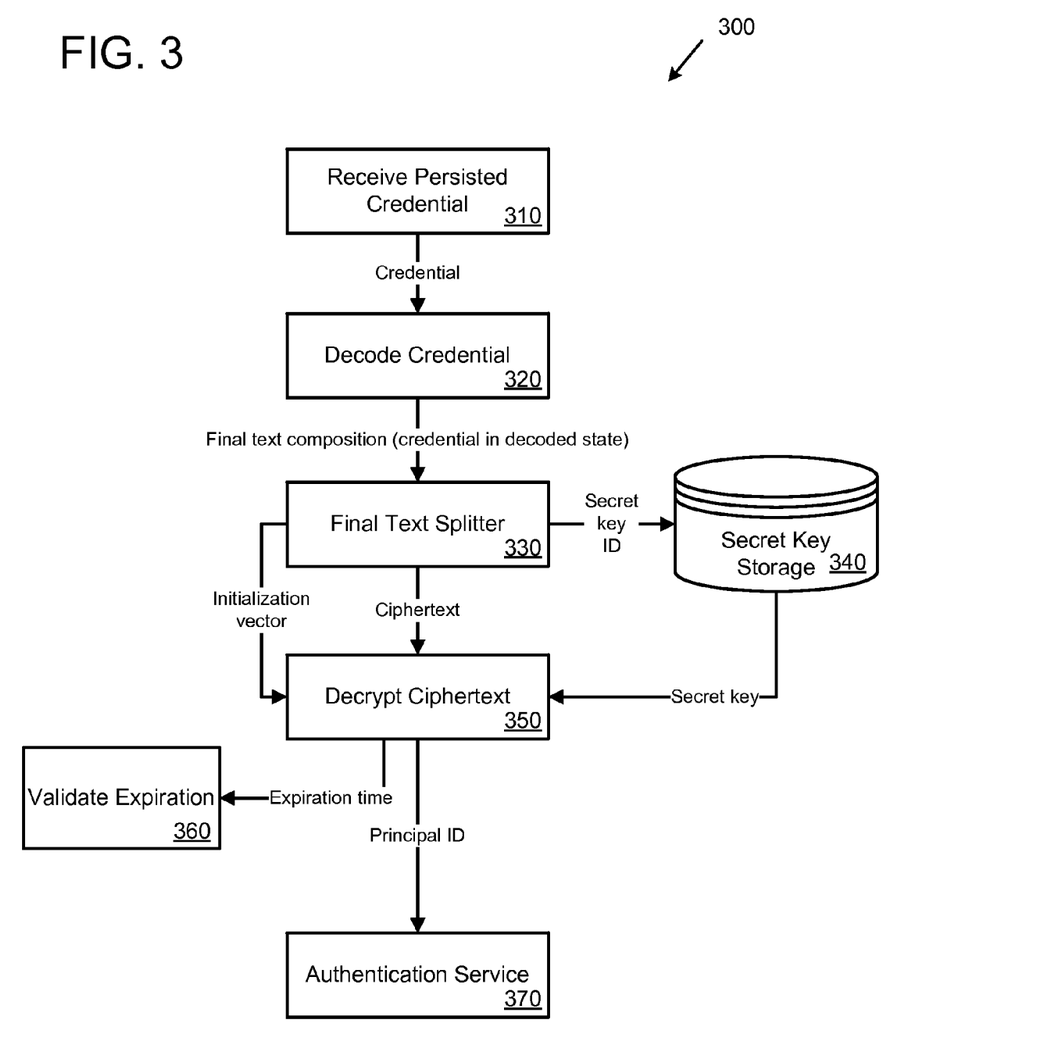
FIG. 3 is a diagram showing an example information flow for performing distributed authentication using persistent stateless credentials during ingress.

FIG. 3 is a diagram showing an example information flow 300 for performing distributed authentication using persistent stateless credentials during ingress. For example, the information flow 300 can be performed when a user communicates with a server environment (e.g., when a user accesses an application or other computing service provided by the server environment) in order to authenticate the user.

At 310, a credential is received from a client device (e.g., from the user's computing device). The credential comprises a ciphertext, an initialization vector, and a secret key identifier. The ciphertext is encrypted and comprises a principal ID identifying the user and an expiration time for the credential. The initialization vector is a value (e.g., a random number) that was used during encryption of the credential. The secret key identifier identifies a secret key associated with the user that was also used during encryption of the credential.

At 320, the received credential is decoded. For example, the credential can be decoded from a base64 encoded format. In some implementations, only some portions of the credential are encoded and therefore need to be decoded (e.g., just the ciphertext portion). If the credential was not encoded, then the decoding operation at 320 may not be present in the information flow (e.g., it can be skipped).

At 330, the final text composition is received and split. The final text composition represents the individual components (e.g., the decoded individual components) of the credential, and comprises the initialization vector, the secret key ID, and the ciphertext.

The secret key ID (obtained from splitting the final text composition at 330) is used to identify and retrieve the secret key from the secret key storage 340. The secret key, initialization vector, and ciphertext are then available for decryption At 350, the ciphertext is decrypted using the initialization vector and the secret key. The ciphertext is decrypted to produce the plaintext, which comprises the decrypted principal ID and the decrypted expiration time.

At 360, the expiration time is checked (e.g., against a current time) to determine whether the credential has expired. If the expiration time is past, then the credential has expired and the user must log in again. If the expiration time has not past, then the credential has not expired.

The user is then authenticated at 370 by the authentication service. For example, the user can be authenticated by determining that the principal ID is valid and the credential has not expired. The authentication service can comprise, for example, a centralized application service and/or a distributed application service. Once the user has been authenticated, then additional processing (e.g., application processing) can be performed. Alternatively, authentication can be performed by other components, applications, or services of the server environment (e.g., by application nodes).

Information Flow—Egress

In the techniques and solutions described herein, distributed authentication using persistent stateless credentials can be provided upon egress (e.g., upon an outgoing communication to a client device, such as when returning from a client request).

Figure 4:
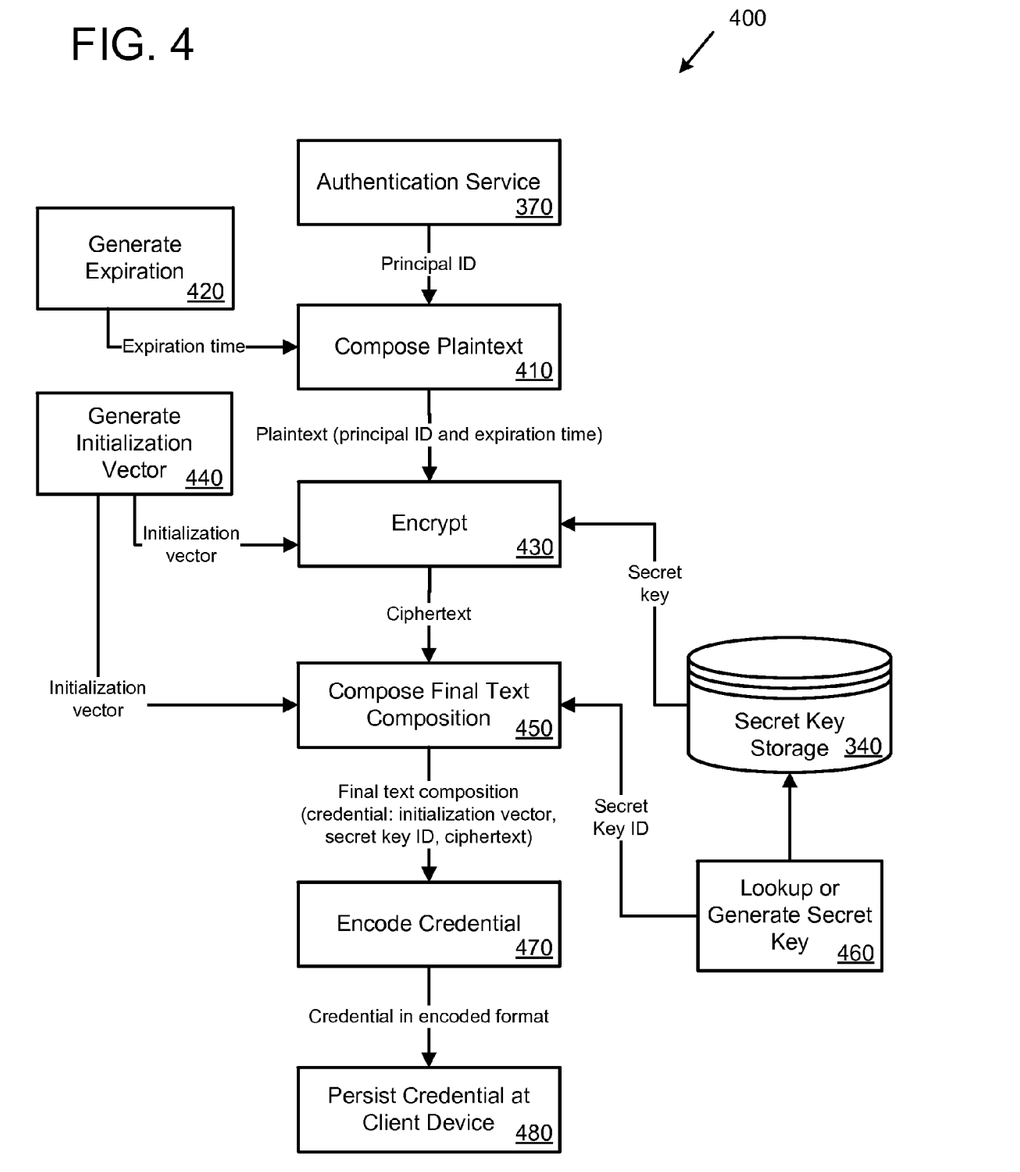
FIG. 4 is a diagram showing an example information flow for performing distributed authentication using persistent stateless credentials during egress.

FIG. 4 is a diagram showing an example information flow 400 for performing distributed authentication using persistent stateless credentials during egress. For example, the information flow 400 can be performed when a user communicates with a server environment (e.g., when a user accesses an application or other computing service provided by the server environment) in order to persist a credential at the client device. By persisting the credential at the client device, the client can subsequently communicate with the server environment (e.g., with the same or a different system or node of the server environment) and provide the persistent credential for authentication.

At 370, the authentication service initiates the information flow 400 to create and persist the credential. For example, the authentication service 370 can be called from an application of a server environment after the application has finished processing data for a user. The authentication service 370 can also be called after the user has completed a log in sequence. Alternatively, the information flow 400 can be initiated by different components, applications, or services of the server environment (e.g., by application nodes).

At 410, a plaintext is composed. The plaintext comprises a principal ID that identifies the user and an expiration time. The expiration time is generated at 420. In some implementations, the expiration time is updated each time that the information flow 400 is performed. For example, if the expiration value is set to 30 minutes, then the expiration time will be set for 30 minutes from the current time. Therefore, if the user accesses the server environment again within 30 minutes, then the expiration time will be updated such that the credential is reset to a 30 minute expiration time. However, if the user does not access the server environment again within 30 minutes, then the credential will expire and the user will have to log in again.

Once the plaintext has been composed at 410, the plaintext will be encrypted at 430 to create a ciphertext. In a specific implementation, the AES-GCM authenticated encryption algorithm is used to encrypt the plaintext (e.g., with a 256-bit key size). Encrypting the plaintext uses an initialization vector generated at 440. The initialization vector is a random number that is used as part of the encryption algorithm to provide authenticated encryption. In a specific implementation, a new initialization vector is generated (the initialization vector is "regenerated") every time the encryption is performed at 430.

Encrypting the plaintext also uses a secret key associated with the user. The secret key is retrieved from secret key storage 340. For example, the secret key can be retrieved from the secret key storage 340 by looking up (at 460) the secret key associated with the user (e.g., by looking up the secret key with a secret key ID and/or with the principal ID). If a secret key is not present in the secret key storage 340 for the user, then a secret key can be generated (at 460) for the user and stored in the secret key storage 340 (e.g., stored in association with the secret key ID and/or the principal ID). In some implementations, the secret key for a user, once created, remains the same. In other implementations, the secret key for a user is changed relatively infrequently (e.g., once a month).

In a specific implementation, secret keys have a lifetime (e.g., one month). If a secret key is needed (e.g., for encryption at 430) and the secret key has expired, then a new secret key is generated (at 460) and stored, and its lifetime is reset (e.g., to one month). Assigning a lifetime to secret keys can provide additional security for the distributed authentication solutions described herein.

Once the plaintext has been encrypted to create the ciphertext at 430, a final text composition is composed at 450. The final text composition comprises the initialization vector that was generated at 440 and that was used to encrypt the ciphertext at 430. The final text composition also comprises the secret key ID that identifies the secret key that was retrieved from the secret key storage 340 and that was used to encrypt the ciphertext at 430. The final text composition represents the credential in an unencoded format.

Once the final text composition has been composed at 450, the final text composition is encoded at 470 to create the credential in an encoded format. For example, the final text composition can be encoded in a base64 format. In some implementations, only the ciphertext portion of the final text composition is encoded.

Once the credential has been created (in either encoded or unencoded format), it is persisted at the client device at 480. For example, the credential can be transmitted to the client device in an HTTP header in encoded format. In some implementations, the credential is only persisted at the client device (and not at the server environment).

Depending on implementation details, the final text composition may not need to be encoded at 470. For example, the final text composition can be used as the credential in its unencoded format. If this is the case, the final text composition can be persisted at the client device as the credential at 480.

Credentials

Figure 5:
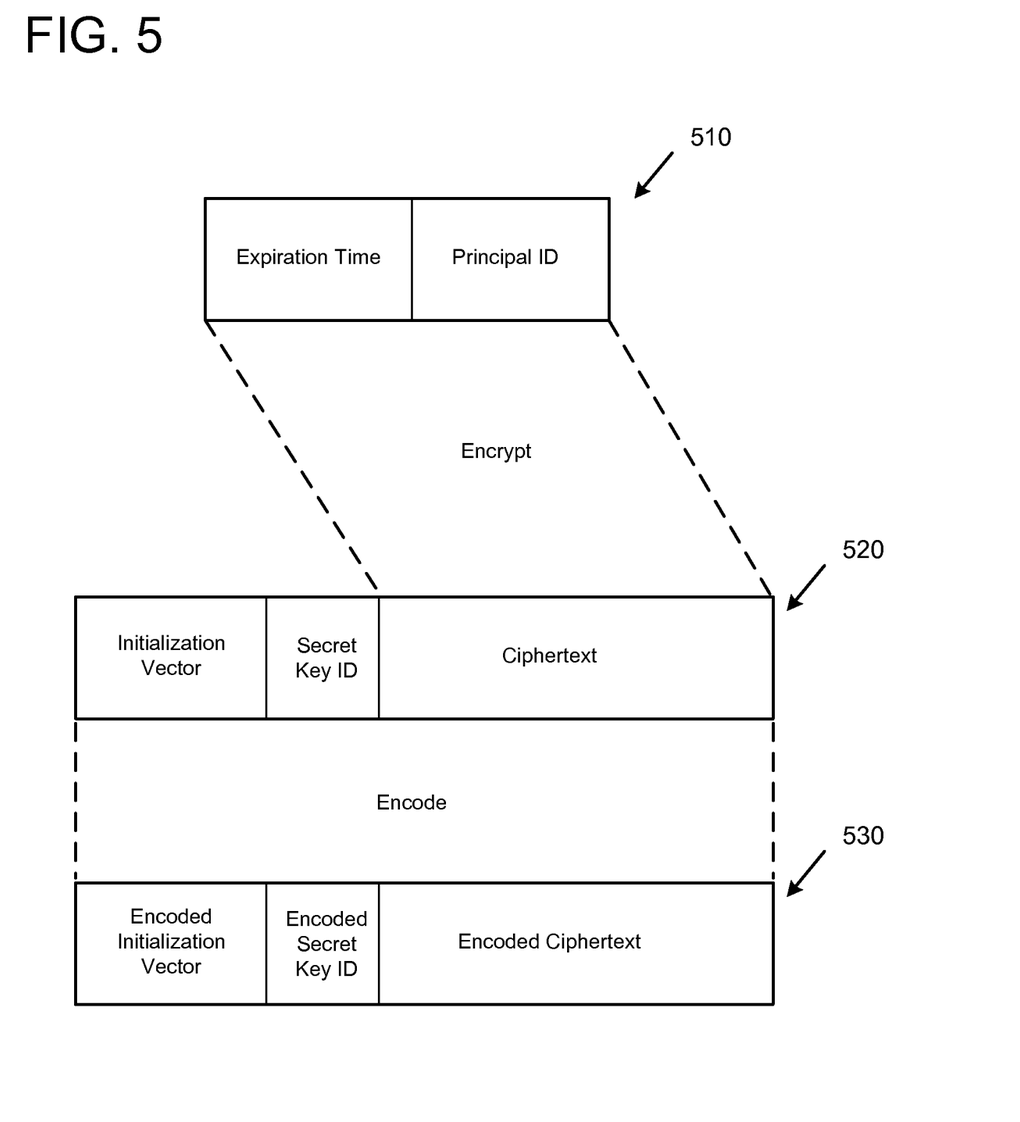
FIG. 5 is a diagram depicting example components of a credential.

In the techniques and solutions described herein, distributed authentication is provided using persistent stateless credentials. FIG. 5 is a diagram depicting the components of a credential. At 510, a plaintext is depicted, which comprises an expiration time and a principal ID.

The plaintext 510 is encrypted to create the ciphertext. Encrypting the plaintext uses an initialization vector and a secret key. The plaintext can be encrypted using an authenticated encryption algorithm.

At 520, a full text composition is depicted. The full text composition depicted at 520 comprises the initialization vector that was used to encrypt the ciphertext, a secret key ID that identifies the secret key used to encrypt the ciphertext, and the ciphertext. The full text composition at 520 is also the credential in an unencoded format. In a specific implementation, the initialization vector is a 16-byte value, and the secret key identifier is an 8-byte value. In other implementations, different size initialization vectors and/or different size secret key identifiers can be used.

At 530, the credential is depicted in an encoded format. In some implementations, the entire credential is encoded (e.g., the components of the credential can be encoded together or independently). Alternatively, only some of the components of the credential can be encoded (e.g., just the ciphertext portion of the credential can be encoded).

Methods for Distributed Authentication Using Persistent Credentials

In the techniques and solutions described herein, methods can be provided for distributed authentication using persistent stateless credentials. For example, distributed authentication can be performed when communication is initiated with a user (e.g., from a user's computing device to a server environment and/or from the server environment to the user's computing device), such as during ingress. Distributed authentication can also be performed at completion of a communication with the user, such as during egress.

Figure 6:
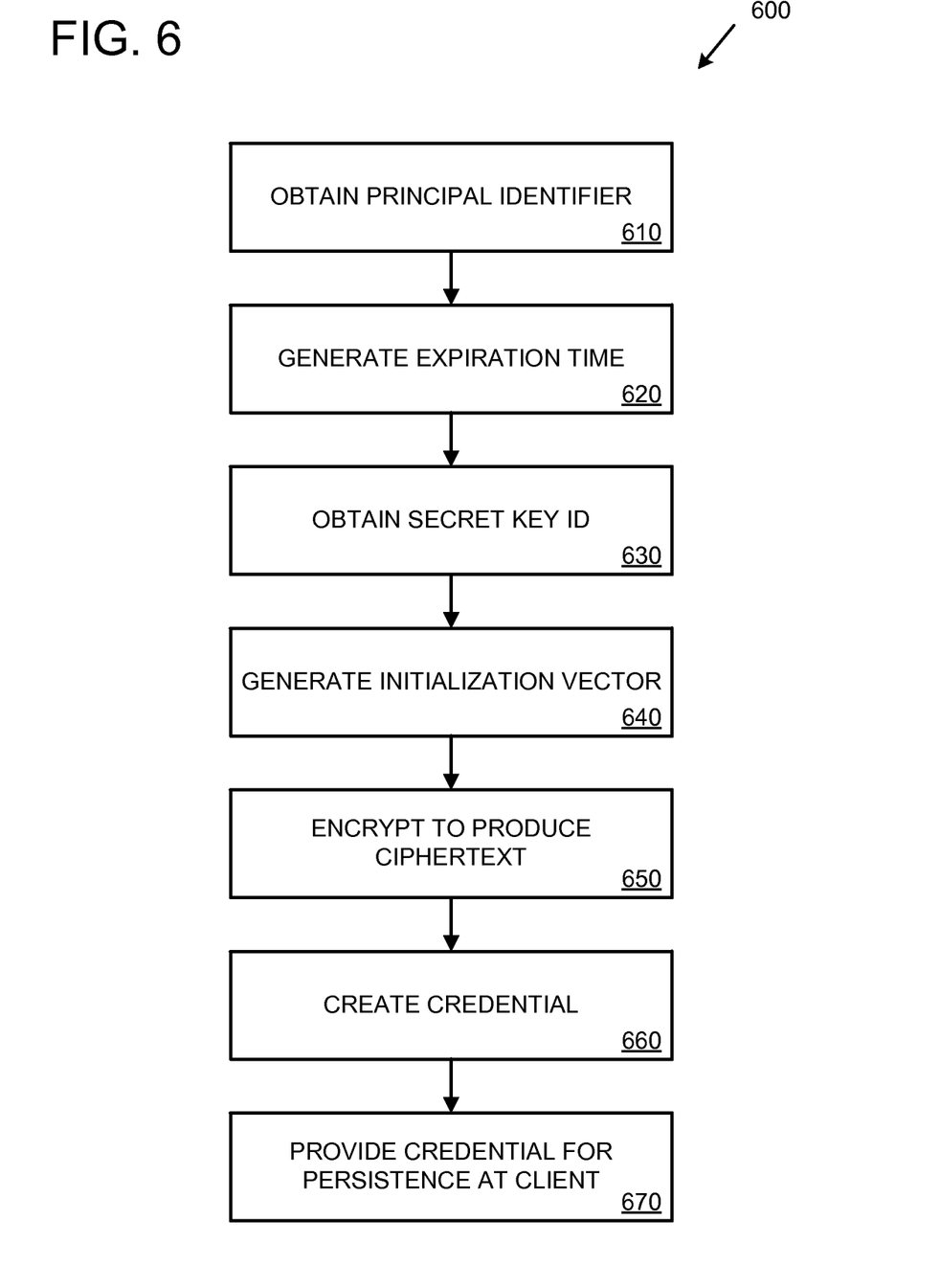
FIG. 6 is a diagram depicting an example flowchart for distributed authentication using persistent stateless credentials.

FIG. 6 is a flowchart showing an exemplary method 600 for distributed authentication using persistent stateless credentials that can be performed, for example, during egress. At 610, a principal identifier is obtained (e.g., by a server environment). The principal identifier uniquely identifies a user (principal) of the credential. The principal identifier can be obtained, for example, from an authentication service of the server environment.

At 620, an expiration time is generated. For example, the expiration time can be generated by adding a value (e.g., 30 minutes) to the current time.

At 630, a secret key identifier is obtained. The secret key identifier identifies a secret key that is associated with the user. The secret key can be obtained, for example, from shared secret key storage. In some implementations, secret keys are associated with an expiration value (e.g., one month) such that if the secret key has expired a new secret key will be generated.

At 640, an initialization vector is generated. The initialization vector can be a random number (e.g., a 16 digit random number).

At 650, the principal identifier and the expiration time are encrypted using the initialization vector and the secret key identified by the secret key identifier. The encryption produces a ciphertext, which comprises the encrypted principal identifier and expiration time. In some implementations, a plaintext composition is first generated that comprises the principal identifier and the expiration time (e.g., the principal identifier and the expiration time can be concatenated to form the plaintext). Then, the plaintext composition is encrypted to produce the ciphertext.

At 660, a credential is created. The credential comprises the ciphertext, the initialization vector, and the secret key identifier. In some implementations, the credential is created by first generating a full text composition comprising the ciphertext, initialization vector, and secret key identifier (e.g., the ciphertext, initialization vector, and secret key identifier can be concatenated to form the full text composition). In some implementations, the credential (e.g., the full text composition) is encoded. For example, the entire credential can be encoded and/or just the ciphertext portion of the credential can be encoded.

At 670, the credential is provided for persistence at the client device. For example, the credential can be provided to the client device in an HTTP header. The credential can be persisted only at the client device (e.g., and not at the server environment).

Figure 7:
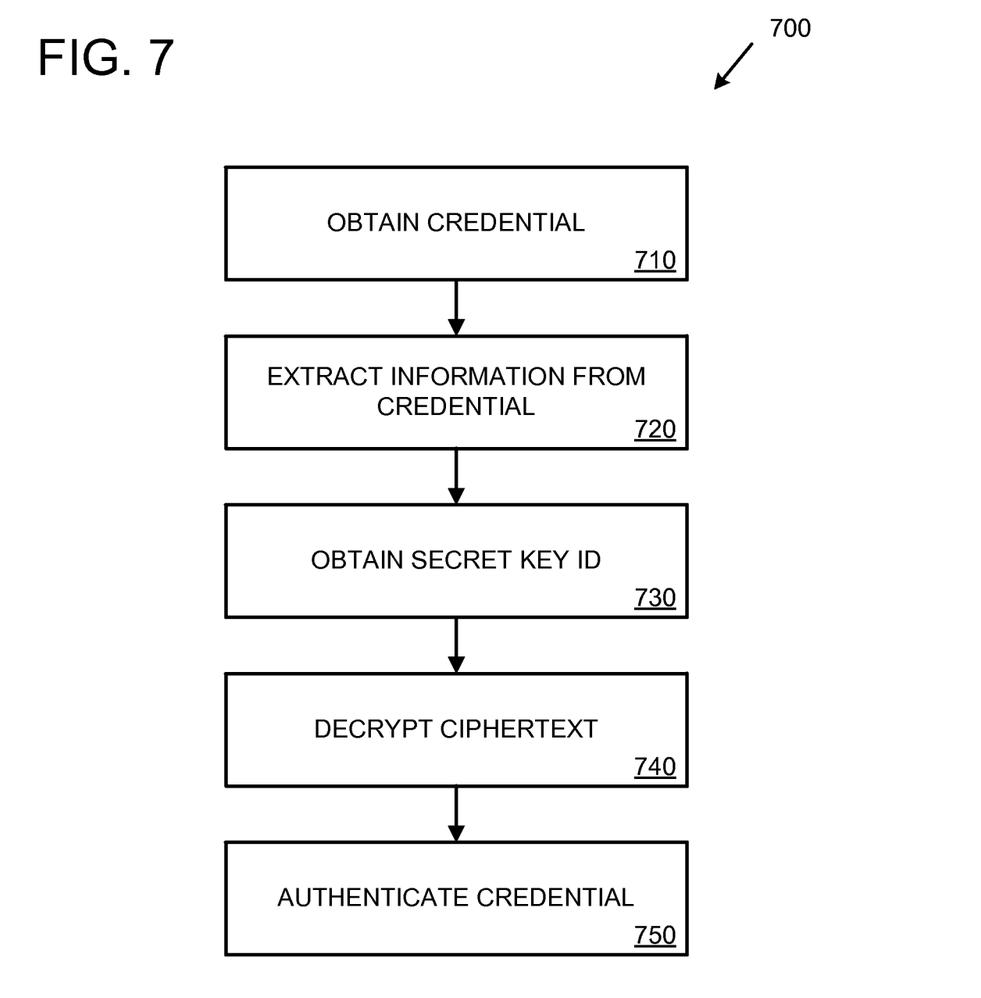
FIG. 7 is a diagram depicting another example flowchart for distributed authentication using persistent stateless credentials.

FIG. 7 is a flowchart showing an exemplary method 700 for distributed authentication using persistent stateless credentials that can be performed, for example, during ingress. At 710, a credential is obtained (e.g., received by a server environment from a client computing device or from another source). The credential comprises a ciphertext, an initialization vector, and a secret key identifier.

In some implementations, the credential is encoded. For example, one or more of the components of the credential are encoded separately or together. If some or all of the credential is encoded, then it can be decoded to prepare the credential for decryption. The credential in its decoded state can be called the full text composition.

At 720, information is extracted from the credential (e.g., the credential is split into its components). At least the following information is extracted from the credential: the ciphertext, the initialization vector, and the secret key identifier.

At 730, a secret key is obtained. The secret key is identified by the secret key identifier that was extracted from the credential. The secret key can be obtained by looking up the secret key identifier in shared secret key storage.

At 740, the ciphertext is decrypted using the initialization vector and the secret key. Decrypting the ciphertext produces a principal identifier (uniquely identifying a user of the credential) and an expiration time.

At 750, the credential is authenticated using, at least in part, the principal identifier and the expiration time. For example, if the expiration time has not past, then the user identified by the principal identifier can be granted authenticated access (e.g., authenticated access to an application provided by the server environment). If the expiration time has passed, then the user can be denied authenticated access. For example, the user can be directed to a logon page which, upon successful logon, can generate a new credential (e.g., a credential with a new expiration time) for the user.

Example Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 8:
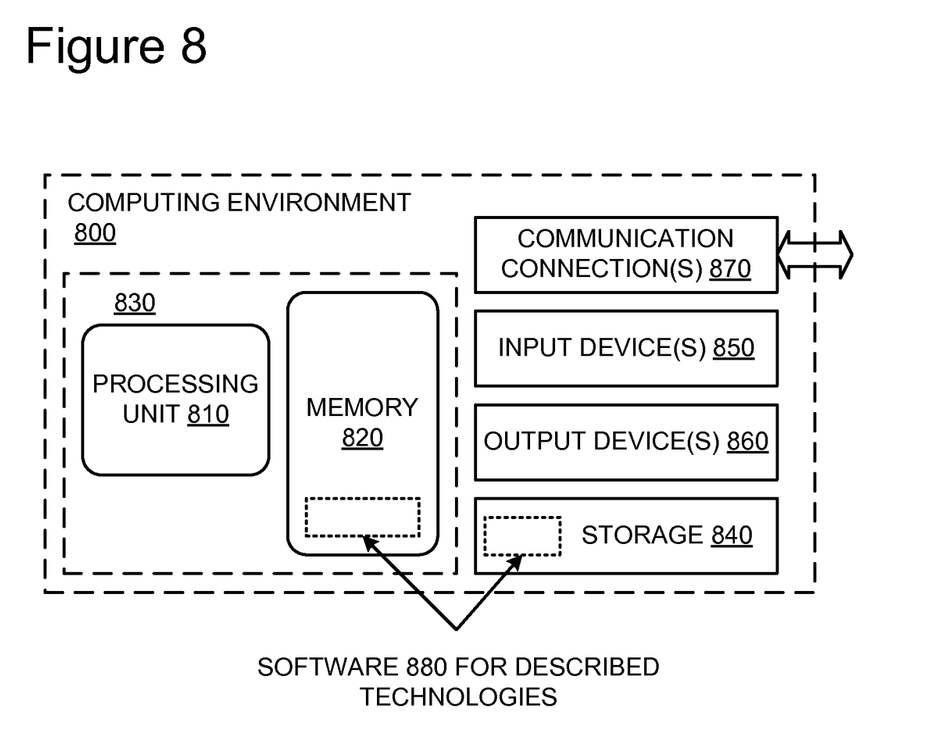
FIG. 8 is a block diagram illustrating an example mobile computing device in conjunction with which techniques and tools described herein may be implemented.

FIG. 8 illustrates a generalized example of a suitable computing environment 800 in which described embodiments, techniques, and technologies may be implemented. The computing environment 800 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 800 includes at least one central processing unit 810 and memory 820. In FIG. 8, this most basic configuration 830 is included within a dashed line. The central processing unit 810 executes computer-executable instructions. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other tangible storage medium which can be used to store information and which can be accessed within the computing environment 800. The storage 840 stores instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, or other data in a modulated data signal.

ALTERNATIVES AND VARIATIONS

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 8, computer-readable storage media include memory 820 and/or storage 840. The term computer-readable storage media does not include communication connections (e.g., 870) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A method, implemented at least in part by a server environment, for distributed authentication using persistent stateless credentials, the method comprising:
   obtaining, by the server environment, a principal identifier, wherein the principal identifier uniquely identifies a user;
   generating, by the server environment, an expiration time;
   obtaining, by the server environment, a secret key identifier, wherein the secret key identifier identifies a secret key that is associated with the user;
   generating, by the server environment, an initialization vector;

encrypting, by the server environment, the principal identifier and the expiration time using the initialization vector and the secret key identified by the secret key identifier, to produce a ciphertext;

creating, by the server environment, a credential, wherein the credential comprises:
the ciphertext;
the initialization vector; and
the secret key identifier; and providing, by the server environment, the credential to a client device for persistence at the client device, wherein the credential is a persistent stateless credential that is not associated with a particular server.

2. The method of claim 1, further comprising:
obtaining the secret key, wherein the secret key is obtained from shared secret key storage, and wherein the shared secret key storage is used for distributed authentication by a plurality of computing devices of the server environment.

3. The method of claim 1, wherein encrypting the principal identifier and the expiration time comprises:
generating a plaintext composition comprising the principal identifier and the expiration time; and
encrypting the plaintext composition using the initialization vector and the secret key identified by the secret key identifier.

4. The method of claim 1, wherein creating the credential comprises:
generating a full text composition comprising the ciphertext, the initialization vector, and the secret key identifier; and
encoding the full text composition to produce the credential.

5. The method of claim 4, wherein the full text composition is encoded in a textual format for transmission to the client device over a network connection.

6. The method of claim 1, wherein the secret key is associated with a secret key expiration value that indicates when the secret key will expire.

7. The method of claim 1, wherein the principal identifier and the expiration time are encrypted using authenticated encryption.

8. The method of claim 1, wherein the secret key is only persisted at the server environment, and wherein the credential is only persisted at the client device.

9. The method of claim 1, wherein, for each of plurality of authenticated requests from the client device to the server environment, a new initialization vector is generated for the authenticated request.

10. A method, implemented at least in part by a server environment, for distributed authentication using persistent stateless credentials, the method comprising:
obtaining, by the server environment, a credential, wherein the credential is associated with a user of a client device, wherein the credential is a persistent stateless credential that is not associated with a particular server;
extracting, by the server environment, from the credential:
a ciphertext;
an initialization vector; and
a secret key identifier;
obtaining, by the server environment, a secret key identified by the secret key identifier;
decrypting, by the server environment, the ciphertext using the initialization vector and the secret key, to produce a principal identifier and an expiration time, wherein the principal identifier uniquely identifies the user associated with the credential; and
authenticating the credential using, at least in part, the principal identifier and the expiration time.

11. The method of claim 10, further comprising:
decoding the credential prior to the extracting, wherein the credential is decoded from a textual format.

12. The method of claim 10, wherein the expiration time indicates a time when the credential will expire.

13. The method of claim 10, wherein authenticating the credential comprises:
determining whether the expiration time of the credential has past.

14. The method of claim 10, wherein authenticating the credential comprises:
determining that the expiration time of the credential has past; and
in response to the determining, directing the user to log in to the server environment.

15. The method of claim 10, wherein authenticating the credential comprises:
determining that the expiration time of the credential has not past;
in response to the determining, granting authenticated access to the user.

16. The method of claim 10, further comprising:
upon egress:
determining whether to create a new credential for persistence at the client device, wherein the determining is based at least in part upon an authentication refresh delay.

17. The method of claim 10, further comprising:
upon egress:
determining whether the credential is older than an authentication refresh delay;
when the credential is older than the authentication refresh delay:
generating a new credential with an updated expiration time; and
providing, by the server environment, the new credential to the client device for persistence at the client device; and
when then credential is not older than the authentication refresh delay:
skipping the generating the new credential and the providing the new credential, wherein the obtained credential remains persisted at the client device.

18. The method of claim 17, wherein the generating the new credential comprises:
generating, by the server environment, the updated expiration time;
generating, by the server environment, a new initialization vector;
encrypting, by the server environment, the principal identifier and the updated expiration time using the new initialization vector and the secret key, to produce a new ciphertext; and
creating, by the server environment, the new credential, wherein the credential comprises:
the new ciphertext;
the new initialization vector; and
the secret key identifier.

19. A server environment, the server environment comprising:
a plurality of server systems comprising processing units and memory, the plurality of server systems configured to perform operations for distributed authentication using persistent stateless credentials, comprising:

obtaining a principal identifier, wherein the principal identifier uniquely identifies a user;

generating an expiration time;

obtaining a secret key identifier, wherein the secret key identifier identifies a secret key that is associated with the user;

generating an initialization vector;

producing a ciphertext by encrypting the principal identifier and the expiration time using the initialization vector and the secret key identified by the secret key identifier;

creating a full text composition, wherein the full text composition comprises:
  the ciphertext;
  the initialization vector; and
  the secret key identifier;

producing a credential by encoding the full text composition; and providing the credential to a client device for persistence at the client device, wherein the credential is a persistent stateless credential that is not associated with a particular server.

20. The server environment of claim 19, wherein the server environment comprises shared secret key storage that is used for distributed authentication by the plurality of server systems, and wherein the secret key is obtained from the shared secret key storage.

21. The server environment of claim 19, wherein the secret key is associated with a secret key expiration value that indicates when the secret key will expire.

22. The server environment of claim 19, wherein the principal identifier and the expiration time are encrypted using authenticated encryption.

23. The server environment of claim 19, wherein the secret key is only persisted at the server environment, and wherein the credential is only persisted at the client device.

24. A computer-readable storage medium storing computer-executable instructions for causing one or more computing devices to perform a method for distributed authentication using persistent stateless credentials, the method comprising:

obtaining a credential, wherein the credential is associated with a user of a client device, wherein the credential is a persistent stateless credential that is not associated with a particular server;

extracting from the credential:
  a ciphertext;
  an initialization vector; and
  a secret key identifier;

obtaining a secret key identified by the secret key identifier;

decrypting the ciphertext using the initialization vector and the secret key, to produce a principal identifier and an expiration time, wherein the principal identifier uniquely identifies the user associated with the credential;

authenticating the credential using, at least in part, the principal identifier and the expiration time;

performing application processing;

generating a new expiration time;

generating a new initialization vector;

encrypting the principal identifier and the new expiration time using the new initialization vector and the secret key identified by the secret key identifier, to produce a new ciphertext;

creating a new credential, wherein the new credential comprises:
  the new ciphertext;
  the new initialization vector; and
  the secret key identifier; and providing the new credential to the client device for persistence at the client device, wherein the new credential is a persistent stateless credential that is not associated with a particular server.

* * * * *